United States Patent
Diesner et al.

(10) Patent No.: US 6,936,982 B2
(45) Date of Patent: Aug. 30, 2005

(54) DEVICE FOR ACTUATING A PLURALITY OF ELECTRIC MOTORS

(75) Inventors: Stefan Diesner, Obertshausen (DE);
Mirko Horaschek, Neusitz (DE);
Juergen Huertgen, Darmstadt (DE);
Werner Kopmeier, Frankfurt (DE);
Lorenz Slansky, Stuttgart (DE);
Markus Thoben, Offenbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/701,079

(22) Filed: Nov. 5, 2003

(65) Prior Publication Data

US 2004/0140779 A1 Jul. 22, 2004

(30) Foreign Application Priority Data

Nov. 7, 2002 (DE) .......................... 102 51 763

(51) Int. Cl.[7] .............................. H02P 1/54; G05B 9/02; H02H 5/04; H01H 73/00
(52) U.S. Cl. ........................... 318/34; 318/103; 700/79; 361/23; 361/115
(58) Field of Search ................................ 318/563, 564, 318/565; 700/79; 361/23, 30, 31, 33, 115, 34–113

(56) References Cited

U.S. PATENT DOCUMENTS

| | | | | |
|---|---|---|---|---|
| 4,284,208 A | * | 8/1981 | Levasseur | 221/129 |
| 5,087,867 A | * | 2/1992 | Kruppa | 318/696 |
| 5,233,511 A | * | 8/1993 | Bilas et al. | 700/17 |
| 5,241,250 A | * | 8/1993 | Nagasawa et al. | 318/591 |
| 5,253,159 A | * | 10/1993 | Bilas et al. | 700/22 |
| 5,412,528 A | * | 5/1995 | Mader et al. | 361/62 |
| 5,646,454 A | | 7/1997 | Mattes et al. | 307/10.1 |
| 5,917,252 A | | 6/1999 | Tokunaga | 307/38 |
| 6,008,597 A | * | 12/1999 | Pardo et al. | 318/3 |
| 6,297,610 B1 | * | 10/2001 | Bauer et al. | 318/562 |
| 6,603,647 B2 | * | 8/2003 | Briesen et al. | 361/91.1 |
| 6,774,600 B2 | * | 8/2004 | Weinbrenner | 318/696 |

FOREIGN PATENT DOCUMENTS

| | | | |
|---|---|---|---|
| DE | 4447174 A1 | 3/1996 | ........... B60R/21/32 |
| DE | 19757113 A1 | 7/1999 | ........... H02J/1/00 |
| DE | 19910194 C2 | 6/2001 | ........... G01L/1/20 |
| DE | 69705002 T2 | 2/2002 | ........... H05B/37/02 |
| EP | 0240805 A2 | 10/1987 | ........... H04Q/3/52 |
| GB | 2163884 A | * 3/1986 | |
| JP | 03045177 A | * 2/1991 | ........... H02P/1/54 |

* cited by examiner

Primary Examiner—David Martin
Assistant Examiner—Patrick Miller
(74) Attorney, Agent, or Firm—Crowell & Moring LLP

(57) ABSTRACT

Device for actuating a plurality of actuators (1) in a transportation device, which has a plurality of output stages (2, 3, 4, 5) and a control circuit for actuating the output stages (2, 3, 4, 5), the output stages (2, 3, 4, 5) each connecting through the current in order to activate the actuators (1) and each output stage (2, 3, 4, 5) being connected in electrically conductive fashion to an actuator (1, 9). A plurality of output stages (2, 3, 4, 5) is additionally connected to in each case, one further actuator (1, 9) by the control circuit. The control circuit is actuated in such a way that an output stage (2, 3, 4, 5) can actuate either the first or the further actuator (1, 9) with the output stages (2, 3, 4, 5) being interconnected to one another and/or to the actuators (1, 9) in the manner of a matrix so that a plurality of row lines (6) and a plurality of column lines (7), at whose points of intersection (8) the actuators (1) are arranged, are provided.

7 Claims, 2 Drawing Sheets

DEVICE FOR ACTUATING A PLURALITY OF ELECTRIC MOTORS

This application claims the priority of German Document No. 102 51 763, filed Nov. 7, 2002, the disclosure of which is expressly incorporated by reference herein.

BACKGROUND AND SUMMARY OF THE INVENTION

The invention relates to a device for actuating a plurality of electric motors in a transportation device, which has a plurality of output stages and a control circuit for actuating these output stages. Each output stage is connected to an electric motor for providing a current for activating the electric motor.

The number of electronic components in the transportation device, in particular in motor vehicles, is continuously increasing. The increasing amount of power electronics in each electric motor respectively entails a proportional increase in the costs of the electronics. Because of the high density of electronics within contemporary transportation devices, in particular the retrofitting of electric motors must also be taken into account. Control circuits and power electronics have to be retrofittable for this situation if the means of transportation is to be retrofitted during its long service life. In addition, electric motors in a motor vehicle are often switched on only for a short time and in many cases this precludes the simultaneous operation of another electric motor in parallel. As a result, the multiple arrangement of expensive output stages within one motor vehicle is a waste of existing electronic resources.

A wide variety of solutions are already used in motor vehicles for actuating electric motors. Such devices relate to means of transportation such as aircraft, waterborne vessels or motor vehicles. These devices have the following design: a control circuit with a microcomputer or a logic circuit evaluates input data and signals from operator control elements and uses sensor signals to calculate the regulating variables and control variables for the means of transportation. For the actual actuation of the electric motor, output stages are used which connect through or disconnect the power current for the electric motor. Today, such output stages have power breakers in the form of transistors, thyristors or diacs. These power breakers are activated by the control circuit in accordance with the calculated control variables and regulating variables so that the current for the electric motors is connected through or disconnected according to requirements. If the current for the electric motors is connected through, they begin to rotate so that, for example, a seat is actuated and can be moved.

In the case of semiconductor switches, a matrix-like arrangement of semiconductors is known which have various semiconductor switches. European Patent EP 240805 A2 discloses a power breaking matrix such as is used in computer technology or in telecommunications. However, there is no consideration here of the generic use for actuating electric motors in means of transportation.

German Patent DE 697 05 002 T2 discloses a matrix-like actuation circuit for a plurality of lamps, in each case one output stage is connected to a row line and a column line. As a result, a plurality of lamps can be actuated with relatively few output stages. The actuation circuit is less suitable for actuating electric motors as they can be operated only in one direction if a motor vehicle battery is used for supplying power.

German Patent DE 199 10 194 C2 discloses a measuring circuit for a pressure-sensitive resistance matrix using operation measuring amplifiers which are connected to the resistor matrix. However, the circuit is not suitable for actuating electric motors.

The object of the present invention is to reduce the number of output stages in order to operate a predefined number of electric motors in both directions of rotation. In addition, when an output stage fails, it is to be possible to actuate the respective electric motor by a further alternative output stage.

This object is achieved according to the invention by using a plurality of output stages additionally connected to, in each case, one further electric motor by the control circuit. The control circuit actuates each output stage in such a way that the output stage can actuate either the first or the further electric motor with the output stages being interconnected to one another and/or to the electric motors in the manner of a matrix so that there are a plurality of row lines and a plurality of column lines, at whose points of intersection the electric motors are arranged. Using each row line and each column line, in each case two output stages are connected to power breakers which connect, in accordance with the signals of the control circuit, to a first or a second potential, in particular earth and $U_{batt}$. As a result the actuated electric motor can be operated either in one direction or the other.

The output stages each have at least one power breaker and control the power currents in order to actuate electric motors in a means of transportation. Such output stages constitute a high cost factor within the means of transportation and it is then possible, within the scope of the teaching according to the invention, to make a saving by eliminating them because the electric motors which are arranged within a matrix can be actuated in each case by an output stage by means of the row lines and column lines. For example, two to nine electric motors can be connected to an output stage at one row line and this output stage can alternatively actuate a plurality of electric motors. Owing to the lower number of output stages, the expenditure on cooling and the installation space for the output stages within the power electronics is reduced. The power semiconductors are utilized effectively, in particular if, of the electric motors arranged in the matrix, in each case only one electric motor can be operated. Moreover, by virtue of the matrix-like arrangement and the possibility of actuating further electric motors in the matrix, the system can also be enlarged by means of further electric motors after the means of transportation has been delivered. For this purpose, all that is needed for the control circuit is new software which permits the output stage to actuate the additional electric motor.

The inventive arrangement of the electric motors within the matrix and the arrangement of the output stages at the end of the row lines or column lines permits the number of output stages to be reduced in comparison with the electric motors to be actuated. Owing to the centralization of the electric motors in matrix form it is possible to construct both the electric motors and the output stages in modular form, i.e. provide them with similar interfaces so that they can be replaced by a further module. Owing to the centralization, the control circuit can be equipped with a more complex power management system for the electric motors as they can then be arranged within one control circuit for all the electric motors. Moreover, the matrix-like structure permits the electric motors and the output stages to be supplied by means of film lines, specifically on the one hand by means of high-current film lines for supplying the electric motors with power and on the other hand by means of low-current film lines for the logic actuation of the output stages by the control circuit. The matrix-like and modular design also makes it easier for failed components to be retrofitted here as all that is necessary is to replace one module in the matrix, and at the same time the interfaces can be respectively standardized.

According to the invention, the device is constructed in such a way that in each case two output stages, which connect to a first or a second potential in accordance with the signals of the control circuit, are connected to each row line and each column line. The first potential may be the zero potential, corresponding to the negative pole of the battery in the means of transportation, while the second potential can be the positive battery voltage, for example 12 to 14 volts. If an electric motor of the matrix is then arranged between the first column line of the first row line, the electric motor is driven, for example, in the clockwise direction if the first row line conducts zero potential and the first column line conducts the positive battery potential, while the electric motor is driven in the anticlockwise direction if the first row line conducts the positive battery potential and the first column line conducts the zero potential. Two output stages, one which connects to the zero potential and one which connects to the positive battery potential, are arranged on the first column line. Thus the respective output stage can be actuated in order to make available the corresponding potential for the electric motor. As two output stages are also arranged on the first column line, one output stage can be actuated by the control circuit to connect through to a positive battery potential. If then, for example, the first row line is connected to zero potential, a further electric motor of the matrix can then be actuated in parallel with the first electric motor if the second column line also connects through the corresponding positive potential. For this purpose, the control circuit actuates the corresponding output stage of the second column line so that the latter connects through the supply current for the second electric motor. By virtue of the redundant arrangement of the two output stages per row line or column line it is possible for each of the lines to be connected alternatively to two potentials, respectively permitting the right-handed or left-handed operation of an electric motor.

The object of the present invention is, however, also achieved by a device where the electric motors are each arranged between two power supply lines with a plurality of electric motors being connected in each case to a common power supply line, and the respective other power supply connection of these electric motors being connected to different power supply lines. Each power supply line is electrically connected to, in each case, two output stages, the first output stage being connected to a first potential, and the second output stage being connected to a second potential. A circuit breaker is provided between a plurality of electric motors and in each case the assigned power supply circuit in order to prevent parallel currents as a result of electric motors which are not actuated.

The device according to the invention reduces the number of output stages for operating the electric motors. The modularization results in improved retrofittability and higher flexibility together with lower costs. Owing to the centralization of the technology, the reliability of the components and of the entire system is improved and, in addition to the reduced expenditure on components and monitoring, it is possible to exchange and replace the individual elements more easily.

The device according to the invention provides for the power-electronic output stages to be interconnected to the actuated electric motors by means of a matrix-like structure. The electric motors are arranged here between a first and a second power supply line, which are also referred to as column lines or row lines. The column lines and row lines are laid within the means of transportation and in technical practice not laid linearly and at right angles to one another. The concepts of column lines or row lines indicate however the actuation pattern of a plurality of electric motors through the various column lines and row lines. The electric motors are distributed between a predefined number of row lines m and a certain number of column lines n in such a way that in each case one power supply line is connected to a connection of the electric motor, while the other power supply line is connected to the other connection of the electric motor. For the sake of easy comprehension of the device it is possible to say that the electric motors are connected to the points of intersection between the column line and the row line. In addition, electric motors can also be arranged between two column lines or between two row lines, in which case the column lines which lie next to one another must however always be connected to different potentials so that the electric motor can be operated. For example, when the first electric motor is operating, the first column line is then at zero potential while the second column line is at positive battery potential. A combination is also possible so that individual electric motors are arranged at the points of intersection between column lines and row lines and other electric motors are connected between in each case, two column lines or, in each case, two row lines. The number of power supply lines between the electric motors is reduced as a result of the matrix-like connection of the electric motors. On each supply line, a plurality of electric motors are connected using the power supply connections provided for that purpose.

The control circuit is connected to the output stages using, for example, film flat lines or conventional lines in order to provide the actuation current for the output stages. The control circuit may have a microcontroller in which the control algorithms are stored in order to be able to operate them in accordance with the requirements in the means of transportation. This microcontroller may also contain the complete control functions of a control device.

As already described, a circuit breaker which helps to avoid parallel currents across the connection matrix is provided within the matrix. The circuit breaker permits an electric motor to be supplied with power by adding the power supply line if the voltage drop across the electric motor, which is caused by the difference in potential between the two power supply lines of the electric motor, is greater than a threshold voltage. The power breaker of the circuit breaker can switch off the flow of current in both directions. This power breaker is intended to prevent the formation of parasitic parallel mass currents across the further electric motors which are arranged within the matrix and not actuated. The circuit breaker prevents the flow of current if there is a series circuit composed of a plurality of electric motors at one row line or one column line. The circuit breaker must operate bidirectionally so that motor currents can permit or disable the left-handed or right-handed rotation of an electric motor.

One possible way of implementing the circuit breaker is what is referred to as an electronic diac. The circuit is composed of two power semiconductor switches which are each connected to the connections of the electric motor and whose other end is connected to the column line or row line. Two Schottky diodes which are connected in antiparallel generate a slight drop in voltage across the power breaker if the latter is connected to the on position. Two Zener diodes which are connected in parallel in crisscross fashion set the breakdown voltage to, for example, 6 to 9 volts so that when this breakdown voltage is exceeded the power semiconductor is switched on in order to feed the supply current to the actuated electric motor. If the breakdown voltage at the Zener diode drops below the necessary threshold voltage when an electric motor is not actuated, the circuit breaker switches off and the electric motor is no longer supplied with the corresponding power current. This ensures that only the electric motors which are actuated directly by the control circuit draw current, while the electric motors in parallel branches of the matrix-like electric motor system remain switched off if the actuation voltage, i.e. the difference in potential between the column line and row line is lower than the breakdown voltage. This electronic diac can expediently be applied to circuit boards and film lines or integrated directly into the electric motor. Owing to the matrix-like structure within the device, an error routine can be initiated if the individual power components fail. For this purpose, it is possible to provide, at those output stages which connect to the lower voltage level, a measuring shunt which has the purpose of measuring current. This measured value can be used to monitor the current of the electric motors and can serve as an overload protection for the power breakers. The registration of the measurement signals and the processing of the corresponding evaluation routine which are necessary for this purpose can then be carried out by means of the control circuit which, in the case of an excess current, switches off the respective electric motor and actuates the electric motor via an alternative output stage.

In each case two of the output stages may be combined to form what is referred to as a MOSFET half bridge, each of which half bridges are connected to the end of a power supply line. The MOSFET half bridge has, for this purpose, two MOSFET semiconductor power breakers which can be connected through by the control circuit via a corresponding actuation circuit. In order to operate a specific electric motor, the column lines and row lines which are connected to this electric motor must be connected to the potential corresponding to the direction of rotation. In this context, one power breaker of the MOSFET half bridge connects to the zero potential, while the other semiconductor switch of the MOSFET half bridge connects to the positive battery potential.

The device according to the invention provides for a matrix-like connection of the electric motors which can each be switched on by a control circuit. The electric motors are operated, for example, by means of the MOSFET half bridges in accordance with the control specifications of the control circuit. The control circuit monitors the power flux within the matrix and performs corresponding error routines if components fail. The circuit breaker in the form of the electronic diac prevents parasitic series connections within the matrix-like interconnection of the electric motors and automatically disconnects non-actuated electric motors from the supply voltage.

The device according to the invention has considerable advantages over conventional actuation circuits within a means of transportation. A number of electric motors, predefined by the requirements made of the means of transportation, may be arranged in modular fashion within the described circuit topology and actuated by means of a relatively small number of output stages. 15 electric motors can be actuated by, for example, 6 MOSFET half bridges, which, without the provided switching matrix, would require approximately 30 half bridges with the same function. However, the matrix-like arrangement also permits the number of control outputs of the control circuit to be reduced, as a result of which the number of susceptible contacts is also reduced. The reduced number of power components also reduces the expenditure on cooling. The installation volume and the weight of the control circuits is reduced. This is apparent in particular in the field of motor vehicle seats where today up to 30 electric motors are used. The reduced expenditure on components permits the reliability of the control devices to be increased.

The electric motor can also be embodied as a stepping electric motor and have a plurality of connections for power supply lines. In each case earth potential or a predefined positive potential is applied to these connections. For this purpose, the motor is connected in an electrically conductive fashion to a plurality of column lines and the output stages can then connect through the voltage in accordance with the control circuit in each case. The stepping motor can be provided, for example, in vehicle seats for setting the sitting position.

There are various possible ways of advantageously configuring and developing the teaching of the present invention. In this respect, reference is made, on the one hand, to the subordinate claims and, on the other, to the following explanation of an embodiment. One embodiment of the device according to the invention is illustrated in the drawing in which, in each case in a schematic representation, Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
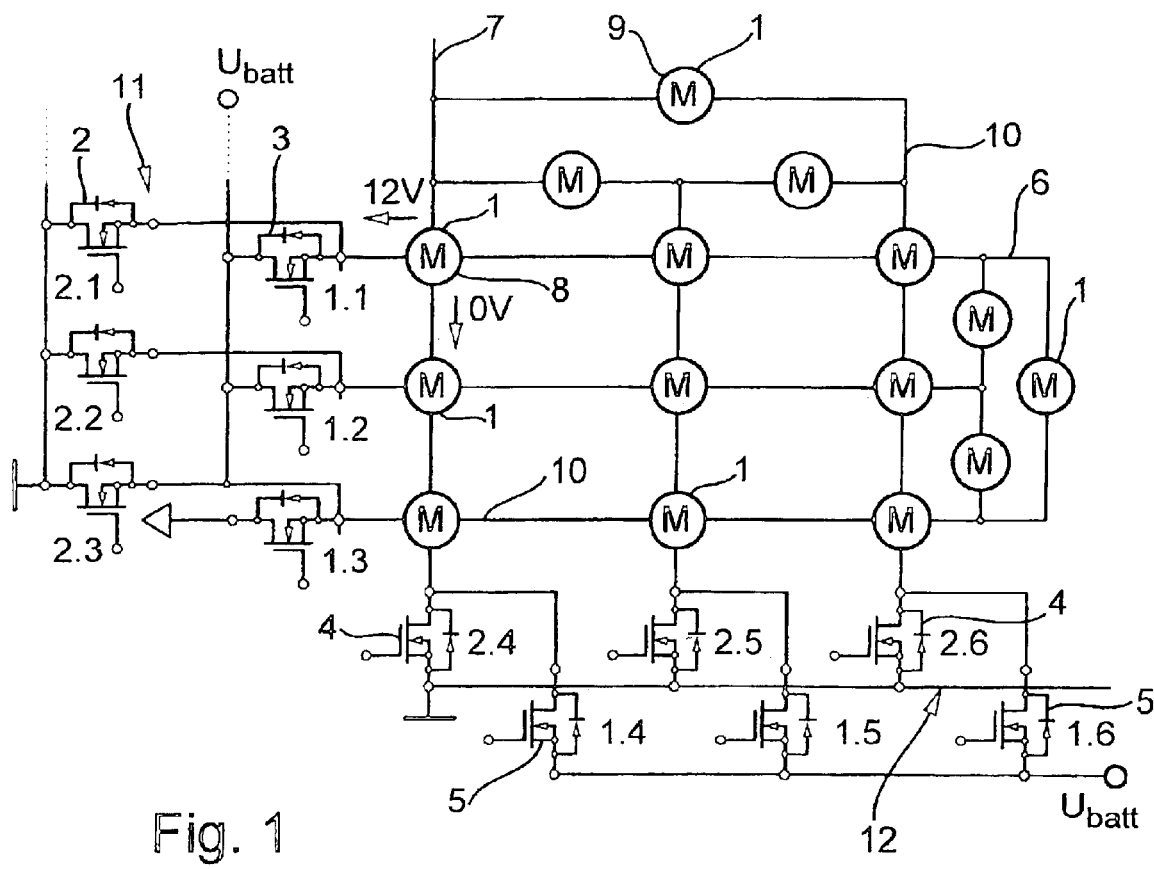
FIG. 1 shows a circuit diagram of the device according to the invention with electric motors which are arranged in the manner of a matrix and the associated output stages.

The device for actuating a plurality of electric motors 1 in a means of transportation has a plurality of output stages 2, 3, 4 and 5, the output stages 2, 3, 4, 5 each connecting through the current for activating the electric motors 1. The electric motors 1 are interconnected according to the invention in the manner of a matrix, three electric motors 1 being connected to the row line 6. Three electric motors 1 are likewise connected to the column line 7. The electric motors 1 are interconnected to one another in the manner of a matrix by means of the row and column lines 6 and 7. In each case two output stages 2, 3 are connected in electrically conductive fashion to, in each case, one end of the row lines 6. The output stage 2 connects the row line 6 in each case to earth, while the output stage 3 connects the row line 6 to the positive battery potential $U_{batt}$. Likewise, the output stage 4 connects the column line 7 to earth, while the output stage 5 connects the column line 7 to the positive battery potential $U_{batt}$. At the point of intersection 8, a first electric motor 1 is connected between the row line 6 and a column line 7. If, for example, the column line 7 is connected to 0 volts by the output stage 4, and approximately 12 volts battery voltage $U_{batt}$ are applied to the row line 6 via the output stage 3, the electric motor 1 is operated in accordance with its intended function. If the output stage 3 switches off so that the circuit is disconnected, the electric motor 1 is also switched off. By actuating the output stages 2, 3, 4, 5 differently it is possible to switch on and off each electric motor 1 located in the matrix. Owing to the matrix-like arrangement, a smaller number of output stages 2, 3, 4, 5 is necessary in total in comparison with the individual actuation of the electric motors 1. In addition to the arrangement of the electric motors 1 at points of intersection 8, it is also possible to arrange an electric motor 9 between a plurality of column lines 7. The electric motor 9 is switched on if one column line 7 is at zero potential and the other column line is at positive battery potential $U_{batt}$.

Figure 2:
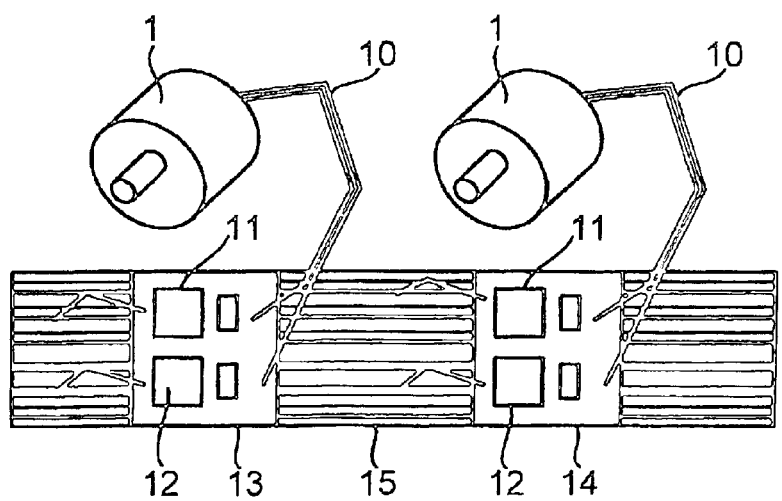
FIG. 2 is a representation of the technical embodiment with two electric motors and their cabling by means of ribbon conductors according to the present invention.

FIG. 2 illustrates part of the device with two electric motors 1 which are connected to power supply lines 10, each with an output stage circuit board 13 and 14, respectively. In each case two half bridges 11 and 12 are arranged on each of the output stage circuit boards 13, 14, two output stages being integrated in each half bridge 11, 12. The output stage circuit board 13 is connected correspondingly to the individual conductors of the ribbon cable 15, and the output stage circuit board 14 is connected to other conductors of the ribbon cable 15 so that a matrix-like interconnection of the electric motors 1 is produced.

Figure 3:
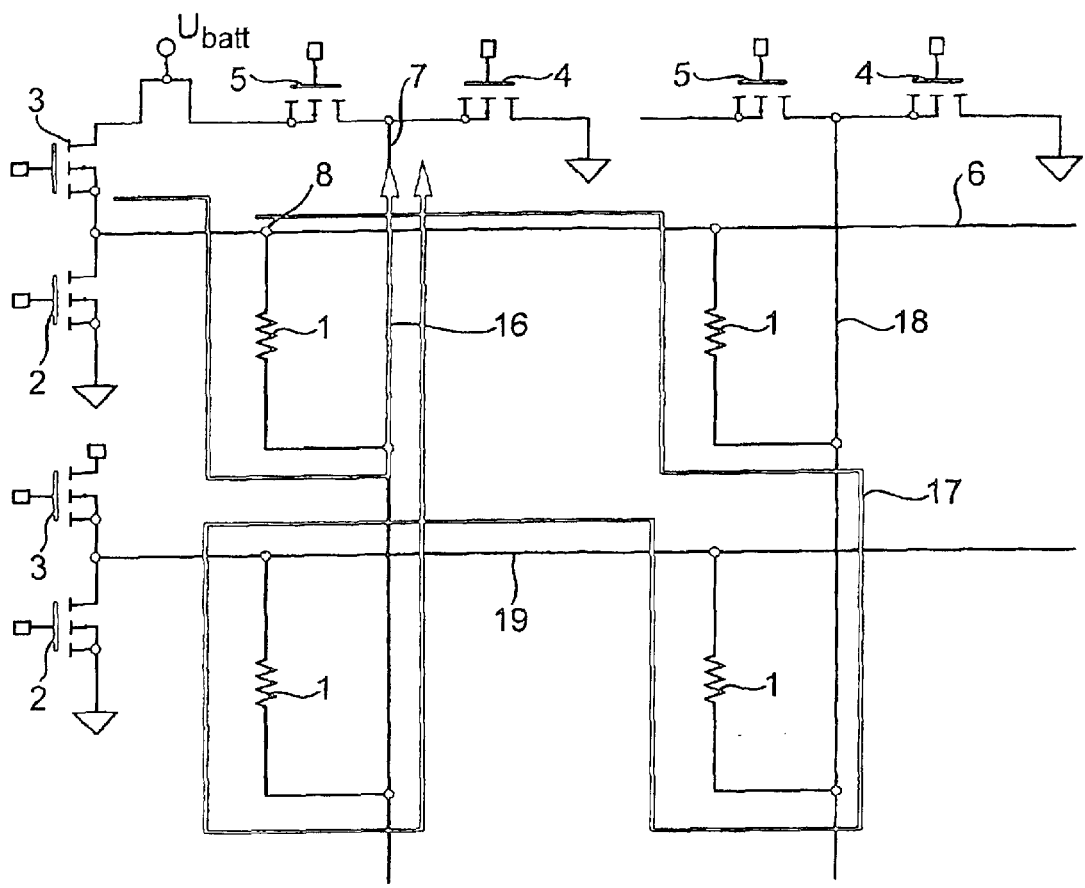
FIG. 3 shows a basic representation of the electric power profile and of the profile of a parasitic parallel current given a matrix-like arrangement of electric motors according to the present invention.

FIG. 3 illustrates the current profile 16 when the electric motor 1 is actuated. To do this, the output stage 3 is connected through so that the potential $U_{batt}$ is connected to the row line 6, the current at the point of intersection 8 flowing through the electric motor 1 to the column line 7 which is connected via the output stage 4 to the earth potential of the battery of the vehicle. Although all the other output stages are switched off in this exemplary embodiment, a parasitic parallel current 17 may be formed, which flows via the row line 6 and the parallel electric motor 1 to the column line 18 and from there via the parallel electric motor 1 to the row line 19 where the current finally flows back to the column line 7 via the electric motor 1, and from said column line 7 to the zero potential. This parasitic parallel current 17 is an undesired power loss which is prevented by the circuit breaker 20 illustrated in FIG. 4.

Figure 4:
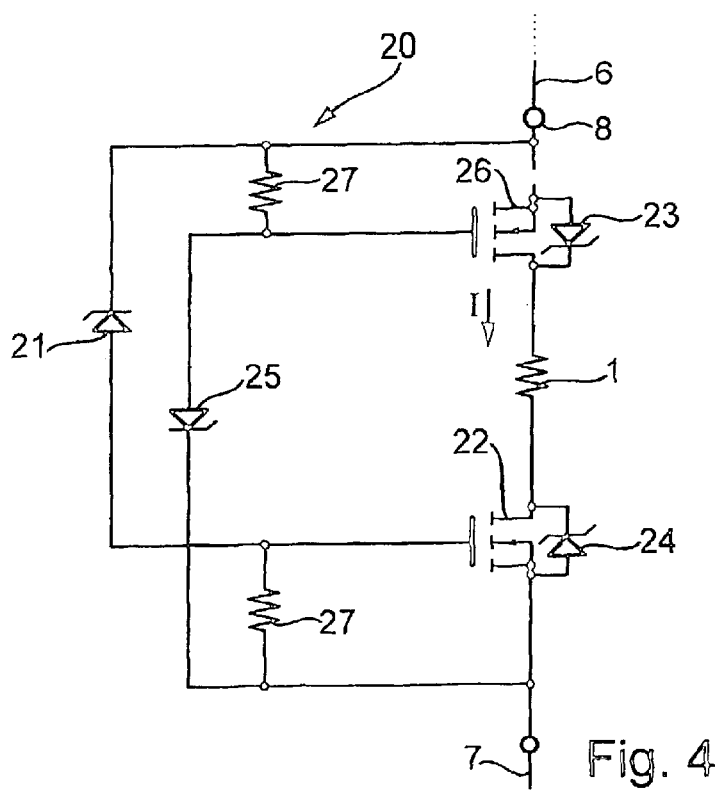
FIG. 4 shows a circuit diagram of a circuit breaker for avoiding parallel currents according to the present invention.

The circuit breaker 20 which is illustrated in FIG. 4 can be arranged at each electric motor 1 in order to avoid parasitic parallel currents 17. The circuit breaker 20 isolates the electric motor 1 from the supply lines 6, 7 when the electric motor 1 is not actuated by the output stages 2, 3 or 4, 5. However, if the electric motor 1 is actuated by the output stages 2, 3, 4, 5 with an actuation voltage of, for example, 12 volts via the row lines 6 and column lines 7, the actuation voltage exceeds the breakdown threshold voltage of the Zener diode 21, which may be at approximately 6 volts, as a result of which the power breaker 22 is connected through so that the current I can flow through the Schottky diode 23 and the power breaker 22.

If the actuation voltage through the output stages 2, 3, 4, 5 is switched off, the Zener diode 21 begins to switch off again, as a result of which the power breaker 22 and the Schottky diode 24, which is connected with opposite polarity, switch off. If the electric motor 1 is operated in the opposite direction in the form of an electric motor, the column line 7 is connected to higher potential, and the row line 6 is connected to zero potential. The breakdown voltage of the Zener diode 25 is exceeded again so that the power semiconductor 26 connects through. The current can then flow in the opposite direction to the first current I through the Schottky diode 24 and the power breaker 26 and in doing so operate the electric motor 1 in the opposite direction. The Schottky diodes 23 and 24 have the positive effect that a particularly low drop in voltage is generated if a high supply current flows through the electric motor 1. The resistors 27 are provided for setting the switching behavior of the circuit breaker 20. The circuit breaker 20 according to the invention is configured in such a way that the assigned electric motor 1 is isolated from the supply current if it is not actuated directly via the output stages 2, 3, 4 and 5. As a result, parasitic parallel currents 17 are prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for actuating a plurality of electric motors in a transportation device, said device comprising:
    a plurality of output stages and
    a control circuit for actuating said output stages, wherein the output stages are connected to a plurality of electric motors, wherein said plurality of output stages are each additionally connected to one further electric motor by the control circuit, and wherein the control circuit actuates each output stage whereby said each output stage actuates one of the plurality of electric motors and the further electric motor, with the output stages being interconnected to one another and to the electric motors in a matrix configuration so that a plurality of row lines and a plurality of column lined at whose points of intersection the plurality of electric motors are arranged, and wherein using each of said plurality of row lines and each of said plurality of column lines, in each case, two of said output stages are connected to power breakers which connect, in accordance with signals of the control circuit, to one of a first and a second potential (earth, $U_{batt}$) so that an actuated one of said plurality of electric motors and said further electric motor can be operated either in one direction or the other, wherein, when one of said output stages fails, an error routine provides switching over to another one of said output stares of the matrix, with the said one electric motor being actuated by another one output stage.

2. The device according to claim 1, wherein a circuit breaker permits one of said electric motors to be supplied with power by an assigned one of said power supply lines if the voltage drop across the said one electric motor which is caused by the difference in potential between two of said power supply lines of the electric motor is greater than a threshold voltage.

3. The device according to claim 1, wherein the control circuit actuates ones of the output stages assigned to a particular one of said first or second potential line in such a way that one power breaker is connected to low battery potential and a further power breaker is connected to high battery potential.

4. The device according to claim 1, wherein the output stages are provided with an actuating interface, and the output stages are each embodied as a standardized module so that each module can be used at a different position in the matrix-like structure.

5. The device according to claim 1, wherein, in specific ones of said output stages, a current measuring circuit is provided, and wherein the control circuit initiates an error routine when there is excess current.

6. A device for actuating a plurality of electric motors in a transportation device, said device comprising:

a plurality of output stages and a control circuit for actuating said output stages whereby the output stages are each connected to at least one of said plurality of electric motors each arranged between two power supply lines wherein said plurality of electric motors are interconnected in a matrix having row lines and column lines wherein each group of two of said plurality of output stages are connected to a first or a second potential line in accordance with signals from said control circuit and wherein said each group are connected to each of said row lines and to each of said column lines and a circuit breaker provided between each of said plurality of electric motors and a respective assigned one of said first and second potential lines in order to prevent parallel currents as a result of at least one of said plurality of electric motors which is not actuated.

7. The device according to claim 6, wherein the circuit breaker switches off the flow of current in both directions of the power supply lines.

* * * * *